US008667324B2

(12) United States Patent
Barlow et al.

(10) Patent No.: US 8,667,324 B2
(45) Date of Patent: Mar. 4, 2014

(54) SYSTEMS AND METHODS FOR CPU REPAIR

(75) Inventors: Jeff Barlow, Roseville, CA (US); Jeff Brauch, Fort Collins, CO (US); Howard Calkin, Roseville, CA (US); Raymond Gratias, Fort Collins, CO (US); Stephen Hack, Fort Collins, CO (US); Lacey Joyal, Fort Collins, CO (US); Guy Kuntz, Richardson, TX (US); Ken Pomaranski, Roseville, CA (US); Michael Sedmak, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1831 days.

(21) Appl. No.: 11/356,521

(22) Filed: Feb. 17, 2006

(65) Prior Publication Data

US 2006/0230230 A1 Oct. 12, 2006

Related U.S. Application Data

(60) Provisional application No. 60/654,740, filed on Feb. 18, 2005.

(51) Int. Cl.
*G06F 11/00* (2006.01)

(52) U.S. Cl.
USPC .......................................... 714/6.13; 714/711

(58) Field of Classification Search
USPC ................................... 714/7, 8, 42, 710, 711
See application file for complete search history.

(56) References Cited

U.S. PATENT DOCUMENTS

| 4,684,885 | A | | 8/1987 | Chapman |
| 5,649,090 | A | * | 7/1997 | Edwards et al. ................. 714/10 |
| 5,954,435 | A | * | 9/1999 | Yoshida ........................... 714/42 |
| 5,961,653 | A | | 10/1999 | Kalter |
| 6,006,311 | A | | 12/1999 | Arimilli |
| 6,181,614 | B1 | | 1/2001 | Aipperspach |
| 6,363,506 | B1 | | 3/2002 | Karri |
| 6,425,094 | B1 | | 7/2002 | Drogichen |
| 6,516,429 | B1 | * | 2/2003 | Bossen et al. ................... 714/47 |
| 6,649,090 | B2 | | 11/2003 | Funaki |
| 6,651,182 | B1 | * | 11/2003 | Chang et al. ..................... 714/3 |
| 6,654,707 | B2 | | 11/2003 | Wynn |
| 6,708,294 | B1 | * | 3/2004 | Nakao et al. .................... 714/42 |
| 6,789,048 | B2 | * | 9/2004 | Arndt et al. .................... 702/186 |
| 6,832,329 | B2 | * | 12/2004 | Ahrens et al. .................... 714/5 |
| 6,851,071 | B2 | * | 2/2005 | Bossen et al. .................... 714/5 |
| 6,922,798 | B2 | * | 7/2005 | Nemani et al. ................. 714/710 |
| 6,954,851 | B2 | | 10/2005 | Natu |
| 6,973,604 | B2 | * | 12/2005 | Davis et al. .................... 714/710 |
| 6,985,826 | B2 | | 1/2006 | Pomaranski |

(Continued)

OTHER PUBLICATIONS

Notice of Allowance dated Jan. 30, 2009 for U.S. Appl. No. 11/356,564 in the United States.

(Continued)

*Primary Examiner* — Marc Duncan (57) ABSTRACT

In one embodiment, a cache element allocation method is provided. Each cache element on a CPU is assigned a quality rank based on the error rate of the cache element. If an allocated cache element is deemed to be faulty, the quality rank of the faulty allocated cache element is compared with the quality rank of the non-allocated cache elements. If a non-allocated cache element has a lower quality rank than the allocated cache element, the non-allocated cache element is swapped in for the allocated cache element.

21 Claims, 6 Drawing Sheets

(56) References Cited

U.S. PATENT DOCUMENTS

| | | | |
|---|---|---|---|
| 7,007,210 B2* | 2/2006 | Fields et al. | 714/718 |
| 7,047,466 B2 | 5/2006 | Meaney | |
| 7,058,782 B2* | 6/2006 | Henderson et al. | 711/170 |
| 7,117,388 B2 | 10/2006 | Arimilli | |
| 7,134,057 B1* | 11/2006 | Kaushik et al. | 714/711 |
| 7,155,637 B2 | 12/2006 | Jarboe, Jr. | |
| 7,155,645 B1 | 12/2006 | Korhonen | |
| 7,321,986 B2* | 1/2008 | Ash et al. | 714/10 |
| 7,350,119 B1* | 3/2008 | Zuraski et al. | 714/711 |
| 7,409,600 B2 | 8/2008 | Azevedo | |
| 7,415,644 B2 | 8/2008 | Bower, III | |
| 7,418,367 B2 | 8/2008 | Pomaranski | |
| 7,523,346 B2 | 4/2009 | Barlow | |
| 7,523,349 B2 | 4/2009 | Barras | |
| 2003/0074598 A1* | 4/2003 | Bossen et al. | 714/6 |
| 2003/0212884 A1 | 11/2003 | Lee | |
| 2004/0133826 A1* | 7/2004 | Zhu et al. | 714/711 |
| 2004/0143776 A1 | 7/2004 | Cox | |
| 2004/0221193 A1 | 11/2004 | Armstrong | |
| 2005/0096875 A1 | 5/2005 | Pomaranski | |
| 2006/0080572 A1 | 4/2006 | Fong | |
| 2006/0248394 A1 | 11/2006 | McGowan | |
| 2008/0235454 A1 | 9/2008 | Duron | |
| 2008/0263394 A1 | 10/2008 | Tanabe | |

OTHER PUBLICATIONS

Final Office Action dated Nov. 4, 2008 for U.S. Appl. No. 11/356,564 in the United States.
Non-Final Office Action dated Jun. 24, 2008 for U.S. Appl. No. 11/356,564 in the United States.
Examiner's Answer dated Sep. 4, 2009 for U.S. Appl. No. 11/356,521 in the United States.
Final Office Action dated Jan. 29, 2009 for U.S. Appl. No. 11/356,521 in the United States.
Non-Final Office Action dated Sep. 23, 2008 for U.S. Appl. No. 11/356,521 in the United States.
Notice of Allowance dated May 22, 2009 for U.S. Appl. No. 11/356,759 in the United States.
Notice of Allowance dated Jan. 29, 2009 for U.S. Appl. No. 11/356,759 in the United States.
Non-Final Office Action dated Sep. 25, 2008 for U.S. Appl. No. 11/356,759 in the United States.
Non-Final Office Action dated Apr. 16, 2009 for U.S. Appl. No. 11/357,385 in the United States.
Non-Final Office Action dated Sep. 25, 2008 for U.S. Appl. No. 11/357,385 in the United States.
Examiner's Answer dated Sep. 4, 2009 for U.S. Appl. No. 11/356,756 in the United States.
Final Office Action dated Mar. 27, 2009 for U.S. Appl. No. 11/356,756 in the United States.
Non-Final Office Action dated Sep. 25, 2008 for U.S. Appl. No. 11/356,756 in the United States.
Notice of Allowance dated Dec. 19, 2008 for U.S. Appl. No. 11/356,560 in the United States.
Notice of Allowance dated Sep. 26, 2008 for U.S. Appl. No. 11/356,560 in the United States.
Notice of Allowance dated Jun. 15, 2009 for U.S. Appl. No. 11/357,384 in the United States.
Final Office Action dated Mar. 23, 2009 for U.S. Appl. No. 11/357,384 in the United States.
Non-Final Office Action dated Sep. 24, 2008 for U.S. Appl. No. 11/357,384 in the United States.
Notice of Allowance dated Jun. 15, 2009 for U.S. Appl. No. 11/356,576 in the United States.
Notice of Allowance dated Mar. 3, 2009 for U.S. Appl. No. 11/356,576 in the United States.
Non-Final Office Action dated Sep. 24, 2008 for U.S. Appl. No. 11/356,576 in the United States.
Non-Final Office Action dated Sep. 23, 2008 for U.S. Appl. No. 11/357,396 in the United States.
Final Office Action dated May 28, 2009 for U.S. Appl. No. 11/357,386 in the United States.
Non-Final Office Action dated Dec. 19, 2008 for U.S. Appl. No. 11/357,386 in the United States.
Final Office Action dated Sep. 9, 2008 for U.S. Appl. No. 11/357,386 in the United States.
Non-Final Office Action dated Jun. 24, 2008 for U.S. Appl. No. 11/357,386 in the United States.
Notice of Allowance dated Sep. 2, 2009 for U.S. Appl. No. 11/356,548 in the United States.
Final Office Action dated Jan. 27, 2009 for U.S. Appl. No. 11/356,548 in the United States.
Non-Final Office Action dated Jun. 25, 2008 for U.S. Appl. No. 11/356,548 in the United States.
Examiner's Answer dated Jun. 9, 2009 for U.S. Appl. No. 11/356,559 in the United States.
Final Office Action dated Nov. 4, 2008 for U.S. Appl. No. 11/356,559 in the United States.
Non-Final Office Action dated Jun. 30, 2008 for U.S. Appl. No. 11/356,559 in the United States.

* cited by examiner

SYSTEMS AND METHODS FOR CPU REPAIR

CROSS-REFERENCE TO RELATED APPLICATIONS

This application claims priority from U.S. Provisional application Ser. No. 60/654,740 filed on Feb. 18, 2005.

This application is also related to the following US patent applications:

"Systems and Methods for CPU Repair", Ser. No. 60/654,741, filed Feb. 18, 2005, Ser. No. 11/356,756, filed Feb. 17, 2006, now U.S. Pat. No. 7,917,804, issued Mar. 29, 2011, having the same title;

"Systems and Methods for CPU Repair", Ser. No. 60/654,259, filed Feb. 18, 2005, Ser. No. 11/356,559, filed Feb. 17, 2006, having the same title;

"Systems and Methods for CPU Repair", Ser. No. 60/654,255, filed Feb. 18, 2005, Ser. No. 11/356,564, filed Feb. 17, 2006, now U.S. Pat. No. 7,533,293, issued May 12, 2009, having the same title;

"Systems and Methods for CPU Repair", Ser. No. 60/654,272, filed Feb. 18, 2005, Ser. No. 11/357,384, filed Feb. 17, 2006, now U.S. Pat. No. 7,607,038, issued Oct. 20, 2009, having the same title;

"Systems and Methods for CPU Repair", Ser. No. 60/654,256, filed Feb. 18, 2005, Ser. No. 11/356,576, filed Feb. 17, 2006, now U.S. Pat. No. 7,603,582, issued Oct. 13, 2009, having the same title;

"Systems and Methods for CPU Repair", Ser. No. 60/654,739, filed Feb. 18, 2005, Ser. No. 11/357,396, filed Feb. 17, 2006, now abandoned, having the same title;

"Systems and Methods for CPU Repair", Ser. No. 60/654,258, filed Feb. 18, 2005, Ser. No. 11/356,560, filed Feb. 17, 2006, now U.S. Pat. No. 7,523,346, issued Apr. 21, 2009, having the same title;

"Systems and Methods for CPU Repair", Ser. No. 60/654,744, filed Feb. 18, 2005, Ser. No. 11/356,548, filed Feb. 17, 2006, now U.S. Pat. No. 7,673,171, issued Mar. 2, 2010, having the same title;

"Systems and Methods for CPU Repair", Ser. No. 60/654,743, filed Feb. 18, 2005, Ser. No. 11/357,386, filed Feb. 17, 2006, now U.S. Pat. No. 7,694,174, issued Apr. 6, 2010, having the same title;

"Methods and Systems for Conducting Processor Health-Checks", Ser. No. 60/654,603, filed Feb. 18, 2005, Ser. No. 11/357,385, filed Feb. 17, 2006, now U.S. Pat. No. 7,694,175, issued Apr. 6, 2010, having the same title; and "Methods and Systems for Conducting Processor Health-Checks", Ser. No. 60/654,273, filed Feb. 18, 2005, Ser. No. 11/356,759, filed Feb. 17, 2006, now U.S. Pat. No. 7,607,040, issued Oct. 20, 2009, having the same title;

which are fully incorporated herein by reference.

BACKGROUND

At the heart of many computer systems is the microprocessor or central processing unit (CPU) (referred to collectively as the "processor.") The processor performs most of the actions responsible for application programs to function. The execution capabilities of the system are closely tied to the CPU: the faster the CPU can execute program instructions, the faster the system as a whole will execute.

Early processors executed instructions from relatively slow system memory, taking several clock cycles to execute a single instruction. They would read an instruction from memory, decode the instruction, perform the required activity, and write the result back to memory, all of which would take one or more clock cycles to accomplish.

As applications demanded more power from processors, internal and external cache memories were added to processors. A cache memory (hereinafter cache) is a section of very fast memory located within the processor or located external to the processor and closely coupled to the processor. Blocks of instructions or data are copied from the relatively slower system memory (DRAM) to the faster cache memory where they can be quickly accessed by the processor.

Cache memories can develop persistent errors over time, which degrade the operability and functionality of their associated CPU's. In such cases, physical removal and replacement of the failed or failing cache memory has been performed. Moreover, where the failing or failed cache memory is internal to the CPU, physical removal and replacement of the entire CPU module or chip has been performed. This removal process is generally performed by field personnel and results in greater system downtime.

SUMMARY

In one embodiment, a method of repairing a processor is provided. The method includes, for example, assigning each cache element a quality rank based on each cache element's error rate, comparing the quality rank of an allocated cache element to the quality rank of a non-allocated cache element, and swapping in the non-allocated cache element for the faulty allocated cache element based on the comparison.

DETAILED DESCRIPTION

The following includes definition of exemplary terms used throughout the disclosure. Both singular and plural forms of all terms fall within each meaning:

"Logic", as used herein includes, but is not limited to, hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

"Cache", as used herein includes, but is not limited to, a buffer or a memory or section of a buffer or memory located within a processor ("CPU") or located external to the processor and closely coupled to the processor.

"Cache element", as used herein includes, but is not limited to, one or more sections or sub-units of a cache.

"CPU", as used herein includes, but is not limited to, any device, structure or circuit that processes digital information including for example, data and instructions and other information. This term is also synonymous with processor and/or controller.

"Cache management logic", as used herein includes, but is not limited to, any logic that can store, retrieve, and/or process data for exercising executive, administrative, and/or supervisory direction or control of caches or cache elements.

"During", as used herein includes, but is not limited to, in or throughout the time or existence of; at some point in the entire time of; and/or in the course of.

Figure 1:
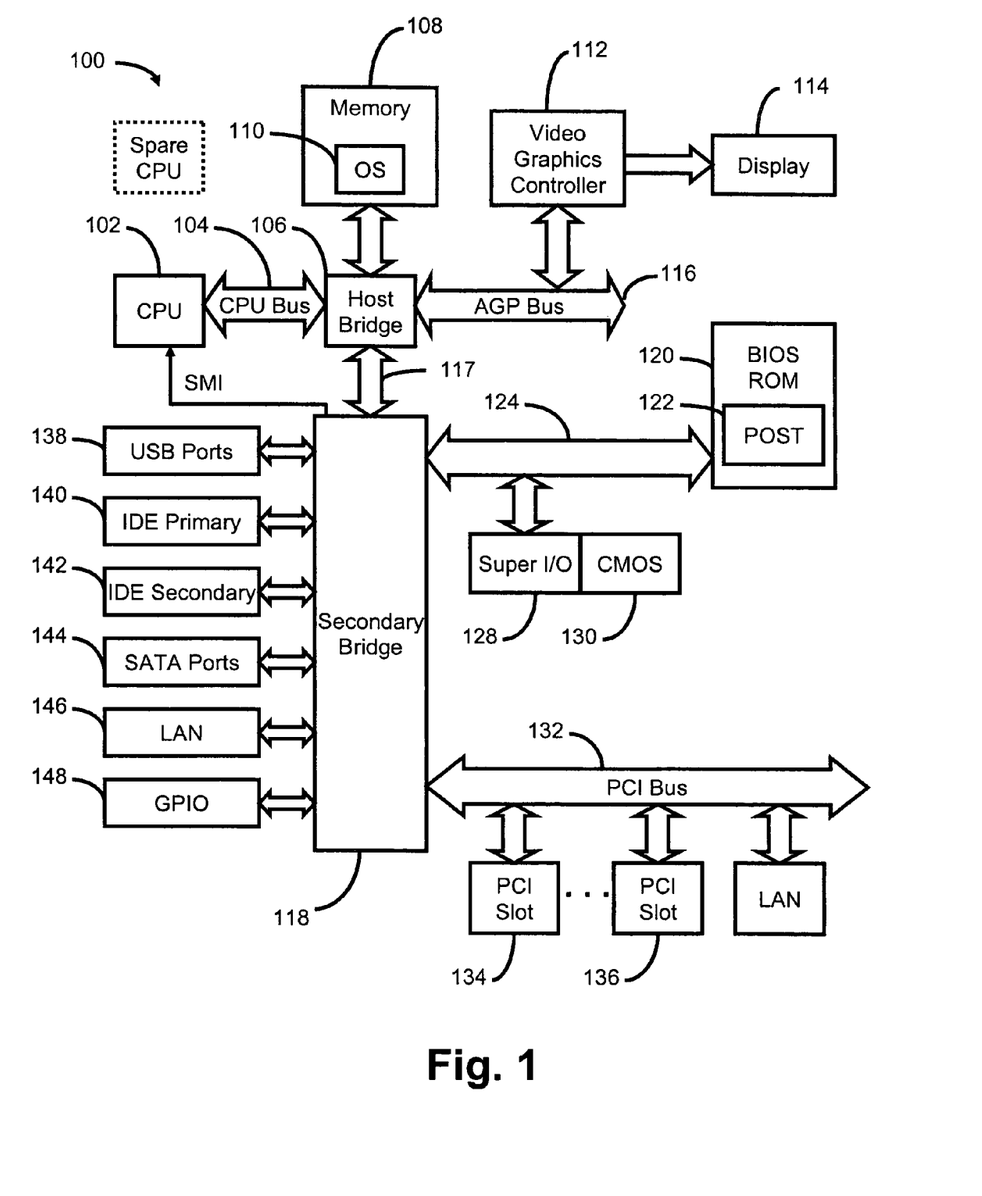
FIG. 1 is an exemplary overall system diagram.

Referring now to FIG. 1, a computer system 100 constructed in accordance with one embodiment generally includes a central processing unit ("CPU") 102 coupled to a host bridge logic device 106 over a CPU bus 104. CPU 102 may include any processor suitable for a computer such as, for example, a Pentium or Centrino class processor provided by Intel. A system memory 108, which may be is one or more synchronous dynamic random access memory ("SDRAM") devices (or other suitable type of memory device), couples to host bridge 106 via a memory bus. Further, a graphics controller 112, which provides video and graphics signals to a display 114, couples to host bridge 106 by way of a suitable graphics bus, such as the Advanced Graphics Port ("AGP") bus 116. Host bridge 106 also couples to a secondary bridge 118 via bus 117.

A display 114 may be a Cathode Ray Tube, liquid crystal display or any other similar visual output device. An input device is also provided and serves as a user interface to the system. As will be described in more detail, input device may be a light sensitive panel for receiving commands from a user such as, for example, navigation of a cursor control input system. Input device interfaces with the computer system's I/O such as, for example, USB port 138. Alternatively, input device can interface with other I/O ports.

Secondary Bridge 118 is an I/O controller chipset. The secondary bridge 118 interfaces a variety of I/O or peripheral devices to CPU 102 and memory 108 via the host bridge 106. The host bridge 106 permits the CPU 102 to read data from or write data to system memory 108. Further, through host bridge 106, the CPU 102 can communicate with I/O devices on connected to the secondary bridge 118 and, and similarly, I/O devices can read data from and write data to system memory 108 via the secondary bridge 118 and host bridge 106. The host bridge 106 may have memory controller and arbiter logic (not specifically shown) to provide controlled and efficient access to system memory 108 by the various devices in computer system 100 such as CPU 102 and the various I/O devices. A suitable host bridge is, for example, a Memory Controller Hub such as the Intel® 875P Chipset described in the Intel® 82875P (MCH) Datasheet, which is hereby fully incorporated by reference.

Referring still to FIG. 1, secondary bridge logic device 118 may be an Intel® 82801EB I/O Controller Hub 5 (ICH5)/ Intel® 82801ER I/O Controller Hub 5 R (ICH5R) device provided by Intel and described in the Intel® 82801EB ICH5/ 82801ER ICH5R Datasheet, which is incorporated herein by reference in its entirety. The secondary bridge includes various controller logic for interfacing devices connected to Universal Serial Bus (USB) ports 138, Integrated Drive Electronics (IDE) primary and secondary channels (also known as parallel ATA channels or sub-system) 140 and 142, Serial ATA ports or sub-systems 144, Local Area Network (LAN) connections, and general purpose I/O (GPIO) ports 148. Secondary bridge 118 also includes a bus 124 for interfacing with BIOS ROM 120, super I/O 128, and CMOS memory 130. Secondary bridge 118 further has a Peripheral Component Interconnect (PCI) bus 132 for interfacing with various devices connected to PCI slots or ports 134-136. The primary IDE channel 140 can be used, for example, to couple to a master hard drive device and a slave floppy disk device (e.g., mass storage devices) to the computer system 100. Alternatively or in combination, SATA ports 144 can be used to couple such mass storage devices or additional mass storage devices to the computer system 100.

The BIOS ROM 120 includes firmware that is executed by the CPU 102 and which provides low level functions, such as access to the mass storage devices connected to secondary bridge 118. The BIOS firmware also contains the instructions executed by CPU 102 to conduct System Management Interrupt (SMI) handling and Power-On-Self-Test ("POST") 122. POST 102 is a subset of instructions contained with the BIOS ROM 102. During the boot up process, CPU 102 copies the BIOS to system memory 108 to permit faster access.

The super I/O device 128 provides various inputs and output functions. For example, the super I/O device 128 may include a serial port and a parallel port (both not shown) for connecting peripheral devices that communicate over a serial line or a parallel pathway. Super I/O device 108 may also include a memory portion 130 in which various parameters can be stored and retrieved. These parameters may be system and user specified configuration information for the computer system such as, for example, a user-defined computer set-up or the identity of bay devices. The memory portion 130 in National Semiconductor's 97338VJG is a complementary metal oxide semiconductor ("CMOS") memory portion. Memory portion 130, however, can be located elsewhere in the system.

Figure 2:
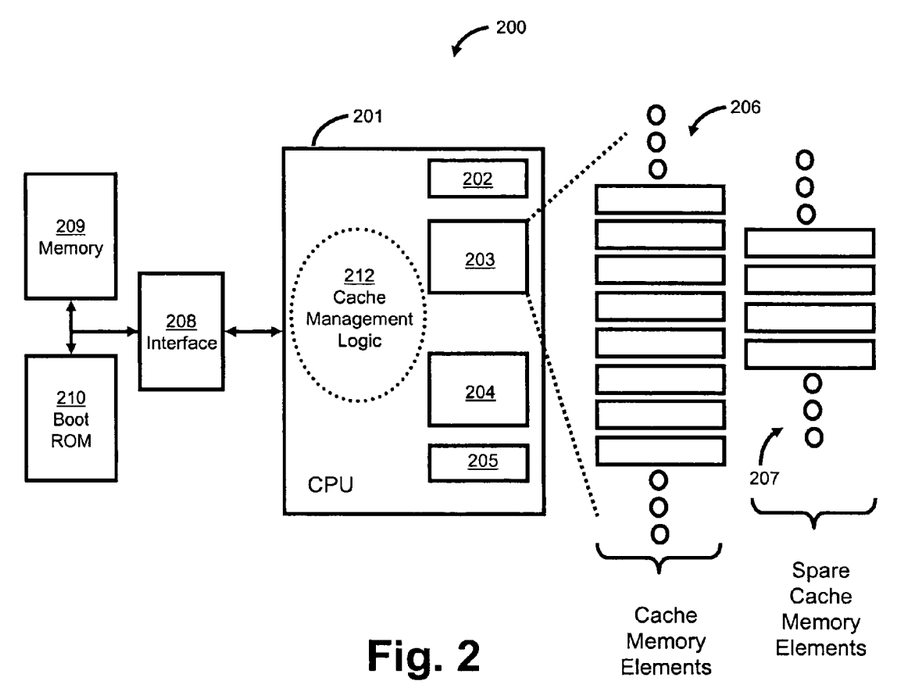
FIG. 2 is an exemplary diagram of a CPU cache management system.

Referring to FIG. 2, one embodiment of the CPU cache management system 200 is shown. CPU cache management system 200 includes a CPU chip 201 having various types of cache areas 202, 203, 204, 205. Although only one CPU chip is shown in FIG. 2, more than one CPU chip may be used in the computer system 100. The types of cache area may include, but is not limited to, D-cache elements, I-cache elements, D-cache element tags, and I-cache element tags. The specific types of cache elements are not critical.

Within each cache area 202, 203, 204, 205 are at least two subsets of elements. For example, FIG. 2 shows the two subsets of cache elements for cache area 203. The first subset includes data cache elements 206 that are initially being used to store data. The second subset includes spare cache elements 207 that are identical to the data cache elements 206, but which are not initially in use. When the CPU cache areas are constructed, a wafer test is applied to determine which cache elements are faulty. This is done by applying multiple voltage extremes to each cache element to determine which cache elements are operating correctly. If too many cache elements are deemed faulty, the CPU is not installed in the computer system 100. At the end of the wafer test, but before the CPU is installed in the computer system 100, the final cache configuration is laser fused in the CPU chip 201. Thus, when the computer system 100 is first used, the CPU chip 201 has permanent knowledge of which cache elements are faulty and is configured in such a way that the faulty cache elements are not used.

As such, the CPU chip 201 begins with a number of data cache elements 206 that have passed the wafer test and are currently used by the CPU chip. In other words, the data cache elements 206 that passed the wafer test are initially presumed to be operating properly and are thus initially used or allocated by the CPU. Similarly, the CPU chip begins with a number of spare or non-allocated cache elements 207 that have passed the wafer test and are initially not used, but are available to be swapped in for data cache elements 206 that become faulty.

Also included in the CPU cache management system 200 is logic 212. In the exemplary embodiment of FIG. 2, the logic 212 is contained in the CPU core logic. However, logic 212 may be located, stored or run in other locations. Furthermore, the logic 212 and its functionality may be divided up into different programs, firmware or software and stored in different locations.

Connected to the CPU chip 201 is an interface 208. The interface 208 allows the CPU chip 201 to communication with and share information with a non-volatile memory 209 and a boot ROM. The boot ROM contains data and information needed to start the computer system 100 and the non-volatile memory 209 may contain any type of information or data that is needed to run programs or applications on the computer system 100, such as, for example, the cache element configuration.

Figure 3:
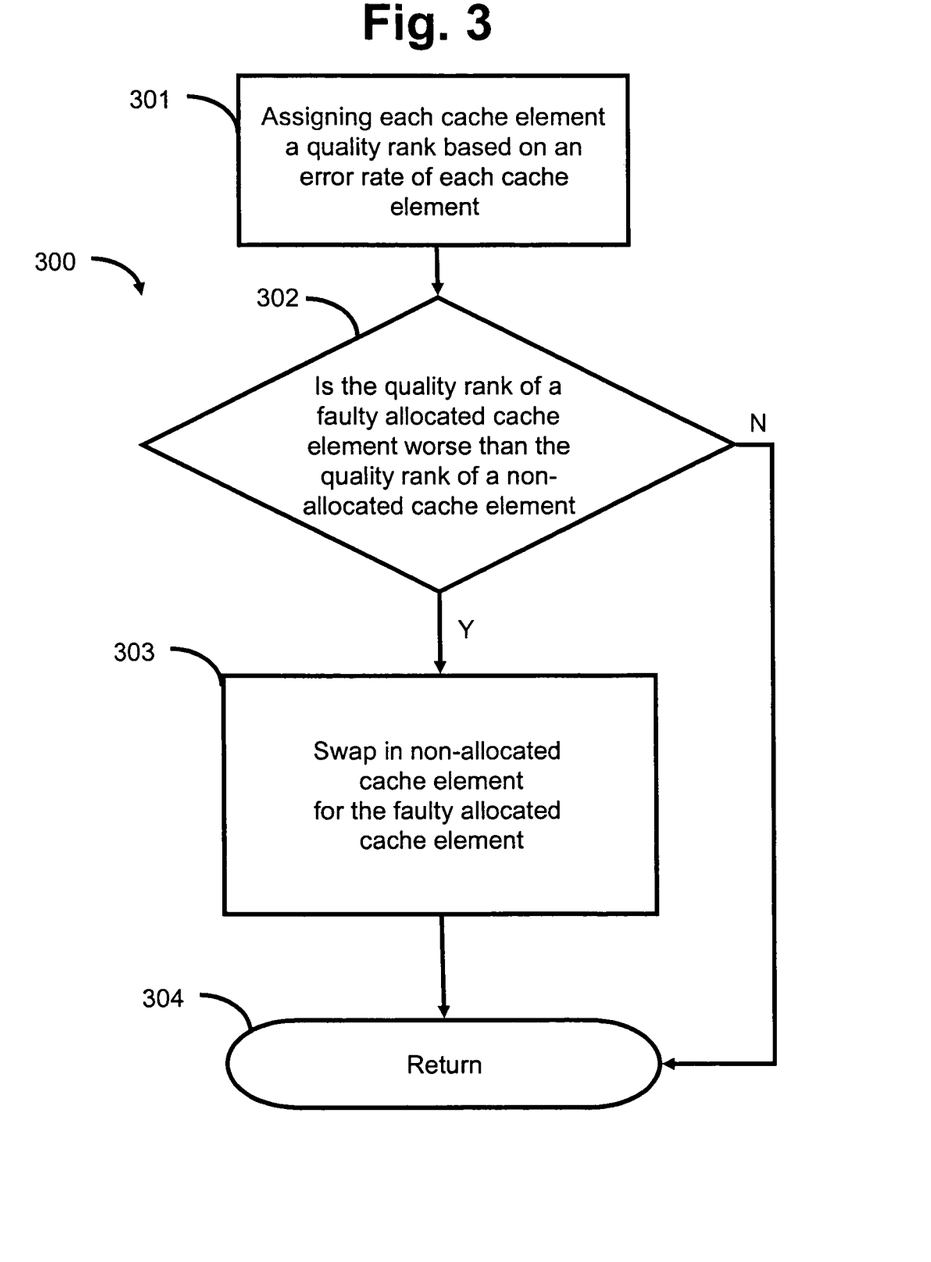
FIG. 3 is a high level flow chart of cache management logic.

Now referring to FIG. 3, a high level flow chart 300 of an exemplary process of the cache management logic 212 is shown. The rectangular elements denote "processing blocks" and represent computer software instructions or groups of instructions. The diamond shaped elements denote "decision blocks" and represent computer software instructions or groups of instructions which affect the execution of the computer software instructions represented by the processing blocks. Alternatively, the processing and decision blocks represent steps performed by functionally equivalent circuits such as a digital signal processor circuit or an application-specific integrated circuit (ASIC). The flow diagram does not depict syntax of any particular programming language. Rather, the flow diagram illustrates the functional information one skilled in the art may use to fabricate circuits or to generate computer software to perform the processing of the system. It should be noted that many routine program elements, such as initialization of loops and variables and the use of temporary variables are not shown.

The cache management logic refers generally to the monitoring, managing, handling, storing, evaluating and/or repairing of cache elements and/or their corresponding cache element errors. Cache management logic can be divided up into different programs, routines, applications, software, firmware, circuitry and algorithms such that different parts of the cache management logic can be stored and run from various different locations within the computer system 100. In other words, the implementation of the cache management logic can vary.

The cache management logic 300 begins after the operating system of the computer system 100 is up and running. During boot-up of the computer system 100, the CPU 201 may have a built-in self-test (BIST), independent of the cache management logic, in which the cache elements are tested to make sure that they are operating correctly. However, the testing and repair must come during the booting process. This results in greater downtime and less flexibility since the computer system 100 must be rebooted in order to determine if cache elements are working properly. However, the cache management logic may be run while the operating system is up and running. While the operating system is running, any internal cache error detected by hardware is stored in the CPU logging registers and corrected with no interruption to the processor. A diagnostics program, for example, periodically polls each CPU for errors in the logging registers through a diagnostic procedure call. The diagnostic program may then determine whether a cache element is faulty based on the error information in the logging registers of each CPU and may repair faulty cache elements if necessary without rebooting the system. As a result, the computer system 100 may monitor and locate faulty cache elements continuously, and repair faulty cache elements as needed While the operating system is running, the cache management logic assigns each cache element a quality rank based on the error rate of each cache element (step 301). More generally, a quality rank includes, but is not limited to, any characteristic or attribute or range of characteristic(s) or attribute(s) that are indicative of one or more states of operation. When an error is caused by an allocated cache element, the cache management logic then determines whether any of the currently-used or allocated cache elements 206 within the CPU are faulty by comparing the quality rank of the allocated cache element with the quality rank of a non-allocated cache element (step 302). If the quality rank of the allocated cache element is better than that quality rank of the non-allocated cache element (step 302), the cache management logic simply returns to normal operation (step 304). However, if the quality rank of the allocated cache element is worse than the quality rank of the non-allocated cache element (step 302), then a spare or non-allocated cache element 207 is swapped in for the faulty currently-used cache element (step 303). The swapping process takes place at regularly scheduled intervals, for example, the cache management logic may poll a CPU every fifteen minutes. If an allocated cache element is determined to be worse than a non-allocated cache element based on their respective quality ranks, then the cache management logic may repair the faulty cache element immediately (i.e. during the procedure poll call) or may schedule a repair at some later time (i.e. during an operating system interrupt or during a system reboot).

Figure 4:
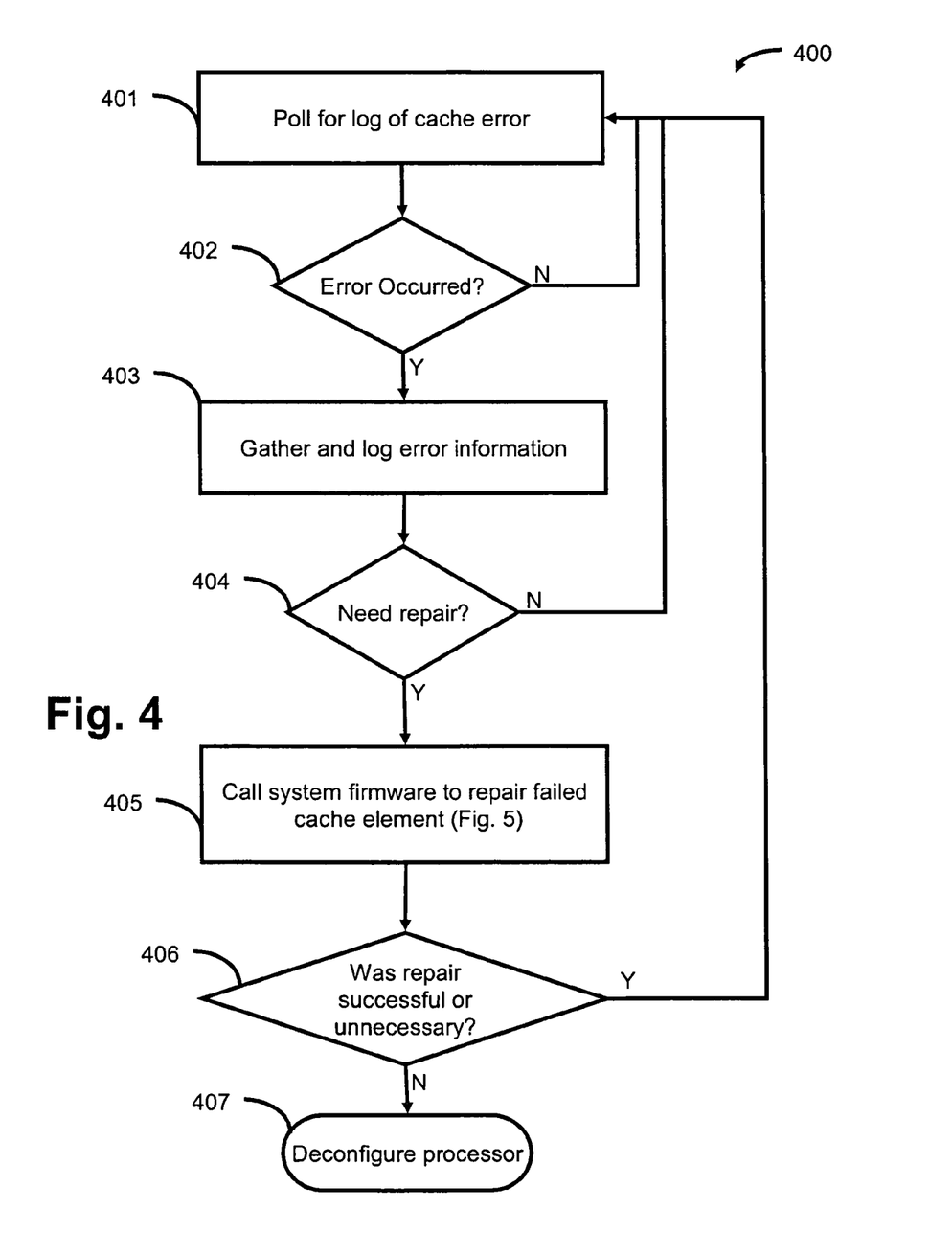
FIG. 4 is a flow chart of one embodiment of cache management logic.

Now referring to FIG. 4, an exemplary process of the cache management logic is shown in the form of a flow chart 400. In the embodiment shown in FIG. 4, the cache management logic begins after the operating system of the computer system 100 is up and running. The cache management logic periodically schedules polling calls to poll the error logs within each CPU. In step 401, the currently used cache elements 206 are polled for cache errors through, for example, a procedure poll call or a hardware interrupt. Polling refers to the process by which cache elements are interrogated for purposes of operational functionality. This can be accomplished by, for example, having a diagnostic program or application monitor the error logs corresponding to each cache elements on a consecutive basis. At step 402, the cache management logic decides whether the particular cache element has produced an error. One method of determining if the cache element has produced an error is by, for example, using or implementing an error-correction code (ECC) routine within the CPU and monitoring how many times error-correction was used on the cache memory element or elements. If an error has not occurred, the cache management logic returns to step 401 and continues polling for cache errors. However, if a cache error has occurred, the cache management logic proceeds to step 403 where it gathers and logs the error information.

The error information that is gathered and logged includes, but is not limited to, the time of the error, which cache element the error occurred, and the type of error. Similarly, the manner in which the error information is logged may vary. For example, the error information may be logged in the non-volatile memory 209 or other memory location.

After the error information has been gathered and logged, the cache management logic determines in step 404 whether the particular cache element that produced the error needs to be repaired. The determination of whether a particular cache element needs to be repaired may vary. For example, in one embodiment a cache element may be deemed in need of repair if its quality rank (which is based on the cache element's error rate) exceeds a predetermined threshold. In another embodiment, a cache element may be deemed in need of repair if its error production exceeds a predetermined threshold number of errors. The threshold number of errors measured may also be correlated to a predetermined time period. In other words, a cache element may be deemed in need of repair if its error production exceeds a predetermined threshold value over a predetermined time period. For example, a cache element may be deemed in need of repair if its error production exceeds 20 errors over the past 24 hour period. As stated above, the precise method of determining if a cache element is in need of repair may vary and is not limited to the examples discussed above.

If the cache management logic determines that the particular cache element does not need to be repaired, the cache management logic returns to step 401 and continues polling for cache errors. However, if the cache element is in need of repair (i.e. the cache element is faulty), the cache management logic advances to step 405 and calls or requests for system firmware, which may be part of the cache management logic, to repair the faulty cache element. The details of the repair process will be explained in greater detail with reference to FIG. 5. While the repair process requested in FIG. 4 is to the firmware, the repair process is not limited to being performed by the firmware, and may be performed by any subpart of the cache management logic.

Once the repair request has been made, the cache management logic determines, at step 406, whether the repair was successful and/or not needed. This can be accomplished by, for example, using the repair process shown in FIG. 5 and discussed later below. If the attempted repair was successful, the cache management logic returns to step 401 and continues polling for cache errors. However, if the attempted repair was not successful, the cache management logic de-configures and de-allocates the CPU chip 201 at step 407 so that it may no longer by used by the computer system 100. Alternatively, the cache management logic may, if a spare CPU chip is available, swap in the spare CPU chip for the de-allocated CPU chip. The "swapping in" process refers generally to the replacement of one component by another including, for example, the reconfiguration and re-allocation within the computer system 100 and its memory 108 such that the computer system 100 recognizes and utilizes the spare (or swapped in) component in place of the faulty (or de-allocated) component, and no longer utilizes the faulty (or de-allocated) component. The "swapping in" process for cache elements may be accomplished, for example, by using associative addressing. More specifically, each spare cache element has an associative addressing register and a valid bit associated with it. To repair a faulty cache element, the address of the faulty cache element is entered into the associative address register on one of the spare cache elements, and the valid bit is turned on. The hardware may then automatically access the replaced element rather than the original cache element.

Figure 5:
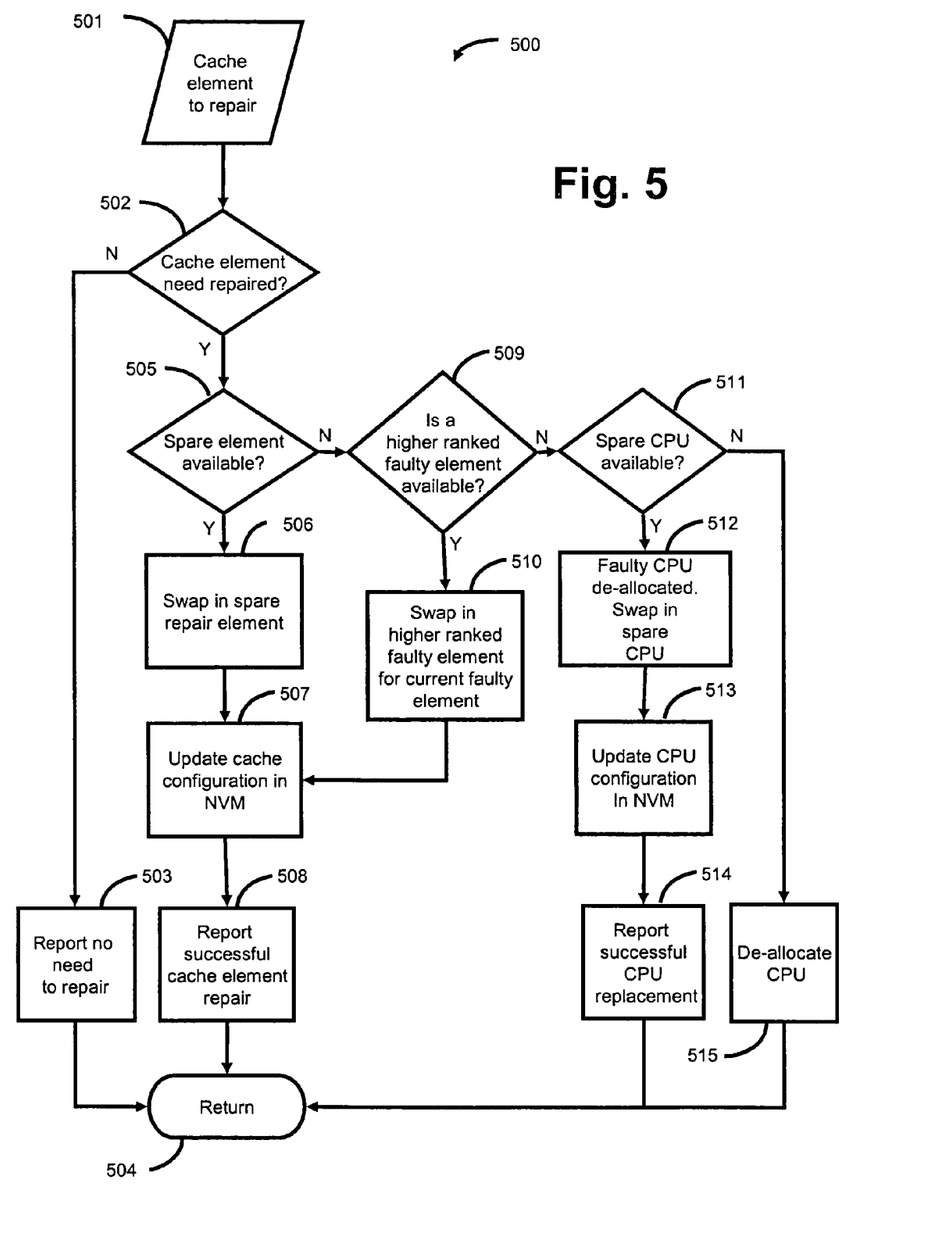
FIG. 5 is a flow chart of a repair process of the cache management logic.

Referring to FIG. 5, one embodiment of a repair process 500 of the cache management logic is illustrated. The repair process 500 begins by gathering the cache element error information related to the cache element that is to be repaired at step 501. Having the necessary cache element error information, the cache management logic again determines, at step 502, whether the particular cache element needs to be repaired. While this may appear to be redundant of step 404, depending on the implementation of the cache managing logic, the determination step 502 may be more thorough than determining step 404. For example, the determining step 404 may be a very preliminary determination performed by the operating system 10 of the computer system 100 based solely on the number of errors that have occurred on the particular cache element. The determining step 502 may be a detailed analysis performed by a specific firmware diagnostics program which may consider more parameters other than the number of errors, such as, for example, the types of errors and the time period over which the various errors have occurred. In alternative embodiments, step 502 may be omitted. Additionally, at step 502, the cache management logic may verify that the requested repair is for the current CPU and may also remove the error from the error log in the non-volatile memory.

It is desirable to manage runtime cache errors during operation of the computer system 100 in order to ensure that the computer system 100 runs smoothly and properly. In order to determine if a cache element is faulty, a continuously updated rank of the severity of the cache errors and performance of the individual cache elements 206 can be maintained. Furthermore, since each type of cache area may have different sensitivity and characteristics and each cache area may have its own repair threshold in determining its quality rank. For example, data cache areas may have a higher threshold than level-2 cache areas.

In one embodiment, this is accomplished by having a diagnostic subsystem or diagnostic logic (a sub-part of the cache management logic) continuously monitor all of the CPUs and their cache elements in the computer system 100. If a cache error is detected, the diagnostic logic logs the location or address of the cache element (e.g., which cache element) and the time of the error occurrence (step 501). Furthermore, the diagnostic logic may check the time of the last error occurrence in that particular cache element. Based on this information, the diagnostic logic assigns a "rank" (quality measure) to the particular cache element. For example, if the particular cache element has received 11 errors in a 24 hour period (error rate), it gets a quality rank of "11." The rank may simply be the error rate (as in the previous example) or it may be a calibrated number based on the error rate which represents the severity of the cache element (severity rank). For example, if the error rate over the last 24 hours is between 0 and 5, the cache managing logic would give the cache element a severity rank of 1, while an error rate between 6 and 10 would get a severity rank of 2, and so on. The severity rank or quality rank may be adjusted/calibrated if desired to have higher numbers indicate lower error rates and lower number indicate higher error rates. In other words, better performing cache elements would have a higher quality number or severity number as compared to poorer performing cache elements.

As stated above, the repair thresholds may vary depending on the type of cache area. For example, the repair threshold for data cache elements 203 might be 31 errors over the previous 24 hours, while the repair threshold for instruction cache elements 204 might be 54 errors over the previous 10 hours. The repair thresholds (including quality rank thresholds and severity rank thresholds) for each cache area will be set in accordance with the characteristics of that particular cache area.

The diagnostic logic stores the rank of the particular cache element (along with the ranks of other cache elements) in the non-volatile memory 209. The cache managing logic may then continuously use the cache element ranks to determine, at step 502 for example, whether a cache element is faulty enough to warrant repairing.

At step 502, the cache management logic compares the quality rank or severity rank to a predetermined threshold. If the quality rank or severity rank exceeds the predetermined threshold, the cache management logic determines that the cache element is in need of repair. For example, the predetermined threshold may be a quality rank of 25 or a severity rank of 5. Therefore, for example, if the quality rank of the cache element exceeds 25 or if the severity rank of the cache element exceeds 5, then the cache element is deemed to be in need of repair.

Figure 6:
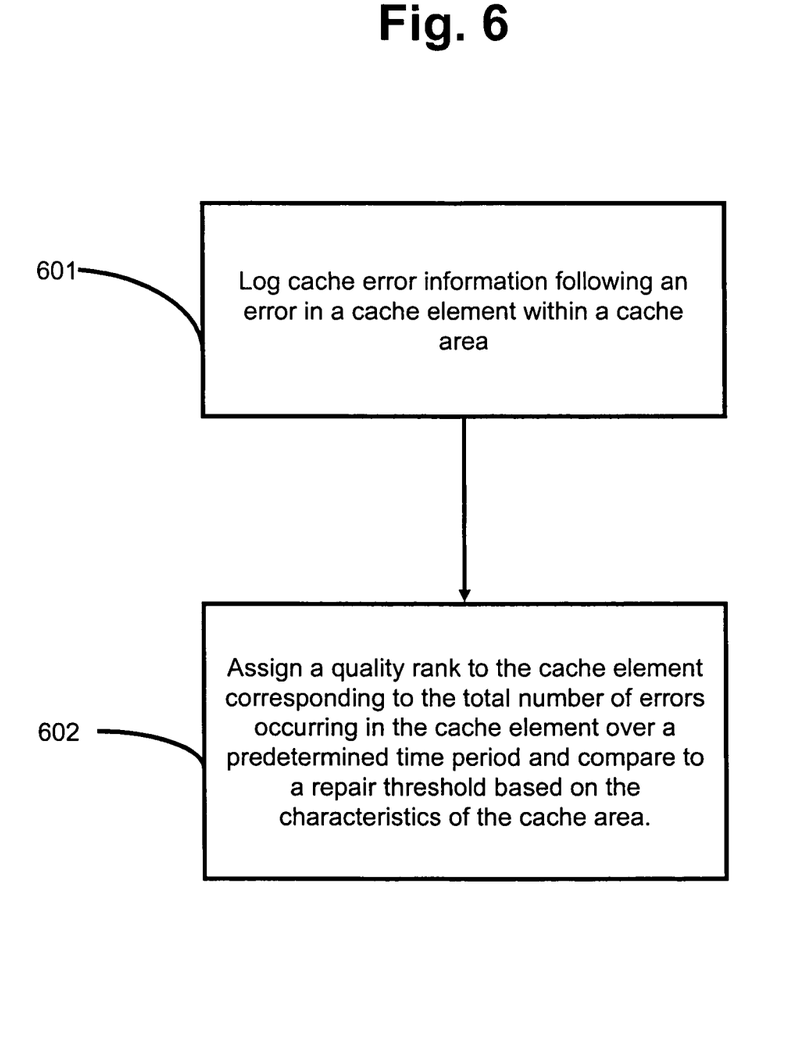
FIG. 6 is a high level flow chart of a second embodiment of cache management logic.

There may also be multiple thresholds corresponding to different cache areas. In such embodiments, as shown in FIG. 6, the cache management logic would first log the cache error information following a cache error (step 601). The cache error information would include which cache area the cache element causing error came from. The cache management logic would then assign a quality rank to the cache element based on the total number of errors occurring in the cache element over a predetermined time period (step 602). As described above, the quality rank has an associated repair threshold based on the characteristics of the cache area that the cache element came from. Also as described above, the associated repair threshold can then be used to determine if that particular cache element is faulty by comparing the two values.

If the cache element does not need to be replaced based on the determination at step 502, the cache management logic reports that there is no need to repair that cache element at step 503 and the cache management logic at step 504 returns to step 406. However, if the repair process 500 determines that the cache element needs to be repaired, the cache managing logic then determines at step 505 whether a spare cache element is available. In making this determination, the cache management logic may utilize any spare cache element 207 that is available. In other words, there is no predetermined or pre-allocated spare cache element 207 for a particular cache element 206. Any available spare cache element 207 may be swapped in for any cache element 206 that become faulty.

If a spare cache element 207 is available, the cache managing logic, at step 506, swaps in the spare cache element 207 for the faulty cache element. A spare cache element may be swapped in for a previously swapped in spare cache element that has become faulty. Hereinafter, such swapping refers to any process by which the spare cache element is mapped for having data stored therein or read therefrom in place of the faulty cache element. In one embodiment, this can be accomplished by de-allocating the faulty cache element and allocating the spare cache element in its place.

Once the spare cache element has been swapped in for the faulty cache element, the cache configuration is updated in the non-volatile memory 209 at step 507. Once updated, the cache managing logic reports that the cache element repair was successful, at step 508, and returns, at step 504, to step 306.

If, however, it is determined, at step 505, that a spare cache element is not available, then the cache managing logic determines if there is a higher ranked (i.e. less faulty) faulty cache element available. In other words, when the cache managing logic determines that a spare cache element is not available, it has determined that all of the initial spare cache elements 207 have been swapped in for other faulty cache elements 206. Each of the faulty cache elements (i.e. swapped out cache elements) that were previously swapped out have a quality rank or severity rank associated therewith. At step 509, the cache managing logic determines whether any of the previously swapped out cache elements have a better quality rank or severity rank than the current faulty cache element. If so, the better quality cache element is swapped in for the faulty cache element and the cache configuration is updated in the non-volatile memory.

For example, computer system 100 begins with two cache elements 206 (CE1 and CE2) and two spare cache elements (SE1 and SE2). Initially, each cache element CE1, CE2, SE1, and SE2 have a quality rank of zero. During normal operation of the computer system 100, CE1 and CE2 are continuously monitored for cache errors. Each time an error occurs, the responsible cache element's quality rank is adjusted accordingly. Assuming that CE1 establishes a quality rank of 35 and the threshold is 25, CE1 is swapped out for SE1. At this time, the cache managing logic stores CE1 as having a quality rank of 35. SE1 begins operation with a quality rank of zero. Assuming that subsequently, CE2 establishes a quality rank of 42 (which exceeds the threshold of 25). CE2 is then swapped out for SE2, which begins operation with a quality rank of zero. The cache managing logic stores CE2 as having a quality rank of 42. As SE1 and SE2 are used by the computer system, SE1 eventually obtains a quality rank of 40. Since the quality rank of 40 exceeds the threshold of 25, the cache managing logic determines that SE1 is faulty and is in need of repair. However, a spare cache element is no longer available since SE1 and SE2 were the only spare elements and since both are currently in use. At this point, under previous solutions, the CPU would have to be de-allocated since no spare cache elements were available. However, under this method, the cache managing logic determines, at step 509, if there is a higher ranked faulty element (having a lower quality rank) available. Since CE1 has a quality rank of 35 and since SE1 has a quality rank of 40, the cache managing logic swaps in CE1 for SE1 at step 510. This allows the CPU to run with the best available cache elements and prolongs the life of the CPU. While this example used quality rank, severity rank could just as well have been used.

If there are no higher ranked faulty elements available, then the cache management logic determines at step 511 whether a spare CPU is available. If desired, the cache management logic may avoid the CPU determining step and simply de-allocate the CPU if there are no spare cache elements. If a spare CPU is available, the cache management logic de-allocates the faulty CPU and swaps in the spare CPU for the faulty CPU at step 512. A spare CPU may be swapped in for a previously swapped in spare CPU that has become faulty. Once the spare CPU has been swapped in for the faulty CPU, the CPU configuration is updated in the non-volatile memory 209 at step 513. Once updated, the cache management logic reports that the CPU repair was successful at step 514 and returns at step 504 to step 406.

Finally, if it is determined at step 511 that a spare CPU is not available, then the cache management logic de-allocates the faulty CPU at step 515 and reports such at step 504. Accordingly, the cache configuration and CPU configuration will change and be updated as different cache elements and CPU chips become faulty and are swapped out for spare cache elements and spare CPU chips. Furthermore, all of the repairing occurs while the operating system of the computer system 100 is up and running without having to reboot the computer system 100. In alternate embodiments, the repairing can occur during the reboot process.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the number of spare cache elements, spare CPUs, and the definition of a faulty cache or memory can be changed. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for ranking CPU cache element quality, the method comprising:
   logging cache error information following an error in a cache element; and
   updating a cache error history database with said logged cache error information; and
   evaluating said cache error history database to determine said quality rank, wherein said quality rank corresponds to a number of errors occurring in said cache element over a predetermined time period;
   assigning said quality rank to said cache element.

2. The method of claim 1, wherein said cache error information includes which element said error occurred and when said error occurred.

3. The method of claim 1, further comprising storing said quality rank into a non-volatile memory.

4. A method for prolonging processor life, the method comprising:
   logging cache error information following an error in a cache element;
   updating a cache error history database with said logged cache error information;
   evaluating said cache error history database to determine a quality rank of said cache element, wherein said quality rank corresponds to a total number of errors occurring in said cache element over a predetermined time period;
   assigning said quality rank to said cache element;
   determining that an allocated cache element is faulty based on said quality rank of said allocated cache element; and
   swapping in a non-allocated cache element for said faulty allocated cache element.

5. The method of claim 4, further comprising determining whether said non-allocated cache element is available if said allocated cache element is determined to be faulty.

6. The method of claim 5, further comprising de-allocating said processor if said non-allocated cache element is not available.

7. The method of claim 6, further comprising swapping in a non-allocated processor for said de-allocated processor.

8. The method of claim 4, further comprising reporting actions taken and updating cache configuration on a memory device.

9. A CPU cache element management system comprising:
   at least one processor having at least one allocated cache element and at least one non-allocated cache element;
   a cache management logic operable to monitor cache errors and record cache error information in a memory and to log cache error information following an error in a cache element, to update a cache error history database with said logged cache error information, to evaluate said cache error history database to determine a quality rank, wherein said quality rank corresponds to a total number of errors occurring in said cache element over a predetermined period of time, and
   wherein said cache management logic is further operable to swap in said non-allocated cache element for said allocated cache element if said allocated cache element is deemed faulty based on said quality rank.

10. The CPU cache element management system of claim 9, wherein said cache management logic is further operable to determine whether said non-allocated cache element is available if said allocated cache element is deemed faulty.

11. The CPU cache management system of claim 10, wherein said cache management logic is further operable to de-allocate said processor if said non-allocated cache element is not available.

12. The CPU cache management system of claim 11, wherein said cache management logic is further operable to swap in a non-allocated processor for said de-allocated processor.

13. The CPU cache management system of claim 9, wherein said cache management logic is further operable to report actions taken and update cache configuration on a memory device.

14. A computer system comprising:
   at least one processor having at least one allocated cache element and at least one non-allocated cache element; and
   a cache management logic operable to log cache error information following an error in a cache element, to update a cache error history database with said logged cache error information, to evaluate said cache error history database to determine a quality rank, wherein said quality rank corresponds to a total number of errors occurring in said cache element over a predetermined period of time, and
   wherein said cache management logic is further operable to swap in said non-allocated cache element for said allocated cache element if said allocated cache element is deemed faulty based on said quality rank.

15. The computer system of claim 14, wherein said cache management logic is further operable to monitor cache errors and record cache error information in a memory.

16. The computer system of claim 14, wherein said cache management logic is further operable to determine whether said non-allocated cache element is available if said allocated cache element is deemed faulty.

17. The computer system of claim 16, wherein said cache management logic is further operable to de-allocate said processor if said non-allocated cache element is not available.

18. The computer system of claim 17, wherein said cache management logic is further operable to swap in a non-allocated processor for said de-allocated processor.

19. The computer system of claim 14, wherein said cache management logic is further operable to report actions taken and update cache configuration on a memory device.

20. A method for managing a computer system having an operating system comprising the steps of:
   monitoring an allocated cache element on a processor for an error;
   logging cache error information following said error in said allocated cache element;
   updating a cache error history database with said logged cache error information;
   evaluating said cache error history database to determine a quality rank for said allocated cache element;
   assigning said quality rank to said allocated cache element corresponding to a total number of errors occurring in said allocated cache element over a predetermined time period; and
   determining whether said allocated cache element is faulty based on said quality rank of said allocated cache element.

21. The method of claim 20, further comprising the steps of: swapping in a non-allocated cache element if said non-allocated cache element is available and said allocated cache element is faulty while said operating system is running; and
updating cache configuration in a memory.

* * * * *